(12) United States Patent
Shen et al.

(10) Patent No.: US 8,712,932 B2
(45) Date of Patent: Apr. 29, 2014

(54) COMPUTER IMPLEMENTED APPARATUS FOR GENERATING AND FILTERING CREATIVE PROPOSAL

(75) Inventors: Geng-Shin Shen, Hsinchu (TW); Hui-Chung Che, Hsinchu (TW)

(73) Assignee: Chipmos Technologies Inc., Hsinchu (TW)

( * ) Notice: Subject to any disclaimer, the term of this patent is extended or adjusted under 35 U.S.C. 154(b) by 166 days.

(21) Appl. No.: 13/543,421

(22) Filed: Jul. 6, 2012

(65) Prior Publication Data

US 2012/0278789 A1   Nov. 1, 2012

Related U.S. Application Data

(63) Continuation-in-part of application No. 12/119,545, filed on May 13, 2008, now Pat. No. 8,245,193.

(30) Foreign Application Priority Data

Dec. 13, 2007   (TW) .............................. 96147623 A

(51) Int. Cl.
   *G06F 15/18* (2006.01)
(52) U.S. Cl.
   USPC ......................................................... 706/12
(58) Field of Classification Search
   USPC ............................................. 706/12, 45, 62
   See application file for complete search history.

(56) References Cited

U.S. PATENT DOCUMENTS

| | | | |
|---|---|---|---|
| 4,336,754 A | 6/1982 | Loeb | |
| 5,926,812 A | 7/1999 | Hilsenrath et al. | |
| 6,338,060 B1 | 1/2002 | Washizawa | |
| 6,728,720 B1 | 4/2004 | Lenzie | |
| 7,010,515 B2 | 3/2006 | Nakano | |
| 2002/0059240 A1 | 5/2002 | Hollenbeck et al. | |
| 2003/0115129 A1 | 6/2003 | Feaver et al. | |
| 2005/0081109 A1 | 4/2005 | Czenwonka | |
| 2005/0234738 A1* | 10/2005 | Hodes ............................. | 705/1 |
| 2005/0289437 A1 | 12/2005 | Oh et al. | |
| 2006/0173920 A1* | 8/2006 | Adler et al. ................ | 707/104.1 |
| 2008/0028364 A1 | 1/2008 | Triou et al. | |
| 2008/0085763 A1 | 4/2008 | Randhawa | |

FOREIGN PATENT DOCUMENTS

| | | |
|---|---|---|
| TW | 594507 | 6/2004 |
| TW | 200414038 | 8/2004 |
| TW | I220484 | 8/2004 |
| TW | 200636508 | 10/2006 |

* cited by examiner

*Primary Examiner* — David Vincent
(74) *Attorney, Agent, or Firm* — Muncy, Geissler, Olds & Lowe, P.C.

(57) ABSTRACT

A computer implemented apparatus for automatically generating and filtering creative proposals is disclosed. Particularly, the computer implemented apparatus automatically generates all possible featured component code sets which corresponding to all possible featured components, and compares them to the prior art code sets which corresponding to the prior objects. Thereby, the novel code sets which corresponding to the novel creative proposals are rapidly filtered out. The computer implemented apparatus comprises a standard component database, a permutation and combination module, a featured component code set database, a prior art code set database, a matching module, a sifting module and an output module.

11 Claims, 1 Drawing Sheet

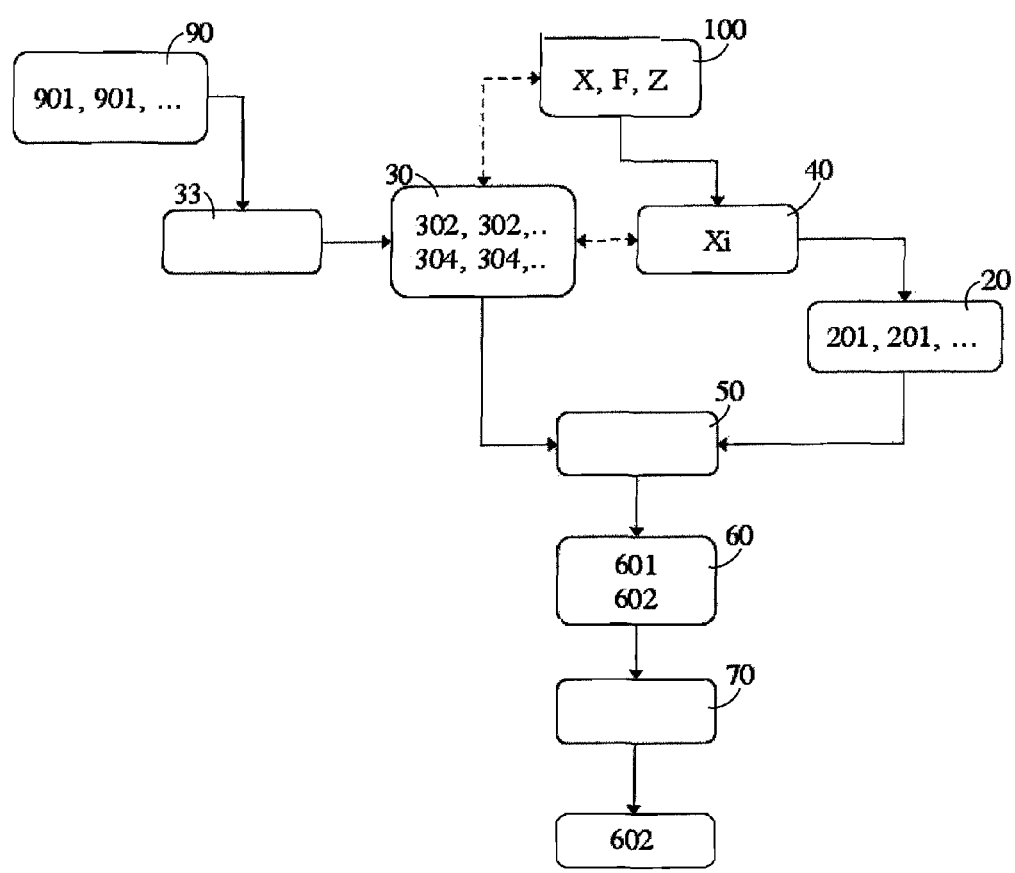

COMPUTER IMPLEMENTED APPARATUS FOR GENERATING AND FILTERING CREATIVE PROPOSAL

CROSS-REFERENCES TO RELATED APPLICATIONS

The present invention is a continuation-in-part application of Ser. No. 12/119,545, which was filed on May 13, 2008, and received the notice of allowance on Apr. 11, 2012.

BACKGROUND OF THE INVENTION

1. Field of the Invention

The present invention relates to a computer implemented apparatus. More particularly, the present invention relates to an apparatus for automatically generating novel creative proposals.

2. Descriptions of the Related Art

In the modern technique-intensive industries, R&D has become an indispensable segment in all enterprises and the achievement of their researches and developments are generally protected by filing patent applications thereof. Some enterprises, for example Semiconductor Energy Laboratory (SEL) in Japan, who have considerable sums of patents or patent applications, have even dismissed their production lines for only remaining RD staff to proceed with the advanced development on their specialties so as to continuously increase the amount of their patents or patent applications. However, it would be a real challenge to effectively manage disclosure concerning increasing innovative products and patents proposing novel technologies so as to transcend competitors by rapidly originating novel inventions and designs. Besides, in the technique-intensive industries where technologies vary from minute to minute, such as semiconductor process, semiconductor packaging or digital systems, there are numerous and promptly increasing inventions and patents. Therefore, a need exists for an approach to efficiently originate novel inventions and designs while ensuring the patentability of these inventions and designs.

Though the prior arts of US2008/0085763, US2003/0115129 and U.S. Pat. No. 6,338,060 disclose related techniques for resolving the aforementioned problems, the need is not satisfied yet.

SUMMARY OF THE INVENTION

In view of resolving the aforementioned problems and need, it is the primary objective of the present invention to provide a computer implemented apparatus for automatically generating and filtering creative proposal. The computer implemented apparatus automatically generates all possible featured component code sets which corresponding to all possible featured components, and compares them to the prior art code sets which corresponding to the prior objects. Thereby, the novel code sets which corresponding to the novel creative proposals are rapidly filtered out. These novel creative proposals with novel code sets are not disclosed in the prior arts and superior to the prior arts in novelty.

To achieve the above objects, the present invention provides computer implemented apparatus for automatically generating and filtering creative proposal, which comprises a standard component database (100), a permutation and combination module (40), a featured component code set database (20), a prior art code set database (30), a matching module (50), a sifting module (60), and an output module (70).

The standard component database (100) contains a plurality of standard components (X). Each standard component (X) comprises at least one feature (F). Each feature is provided with at least one species. Each species has an identification code (Z) correspondingly.

The permutation and combination module (40) is electrically connected to the standard component database (100) and permutes and combines all identification codes (Z) pertaining to each of the standard components (X) so as to form a plurality of featured components (Xi). Each featured component (Xi) is provided with a featured component code set (201) correspondingly;

The featured component code set database (20) is electrically connected to the permutation and combination module (40) and stores all of said featured component code sets (201).

The prior art code set database (30) comprises a plurality of prior art code sets (302). Each prior art code set (302) is derived from a prior object (901) correspondingly by using the definitions of features (F) and identification codes (Z) in the standard component database (100).

The matching module (50) is electrically connected to the featured component code set database (20) and the prior art code set database (30) and matches featured component code set database (20) with the prior art code set database (30). The sifting module (60) is electrically connected to the matching module (50) and generates a first code set portfolio (601) and a second code set portfolio (602). The first code set portfolio (601) consists of common code sets existing in both the featured component code set database (20) and the prior art code set database (30). The second code set portfolio (602) consists of novel code sets existing only in the featured component code set database (20). The output module (70) is electrically connected to the shifting module (60) and outputs a sifting result of the sifting module (60).

BRIEF DESCRIPTION OF THE DRAWINGS

FIG. 1 is a block diagram of a computer implemented apparatus for automatically generating and filtering creative proposal according to a preferred embodiment of the present invention.

DETAILED DESCRIPTION OF THE PREFERRED EMBODIMENT

While the present invention discloses a computer implemented apparatus for automatically generating and filtering creative proposal and manufacturing method thereof, some of the implemented technologies, such as databases and storing module used therein are well known in the art and need not be discussed at length herein. Furthermore, the accompany drawings attached herewith are for illustrating features in connection with the present invention only.

Please refer to FIG. 1, which is a preferred embodiment of the present invention. The computer implemented apparatus for automatically generating and filtering creative proposal comprises a standard component database (100), a permutation and combination module (40), a featured component code set database (20), a prior art code set database (30), a matching module (50), a sifting module (60), and an output module (70).

Each of the standard component database (100), the featured component code set database (20), and the prior art code set database (30) may be stored in a memory, a floppy disk, a hard disk, a compact disk (CD), a mobile disk, a magnetic tape, a physical database, or any other storage media with the same function and well known to those skilled in the art. In addition, each of the permutation and combination module (40), the matching module (50), the shifting module (60), and the output module (70) may be a processor, such as any of various processors, central processing units (CPUs), microprocessors or other processing devices well known to those of ordinary skill in the art.

The standard component database (100) is applied for defining and storing a plurality of standard components (X) by using standard codes. The standard component database (100) contains a plurality of standard components (X), wherein X may be A, B, C, D, etc. Usually, the standard component (X) comprises a plurality of features (F). Occasionally, some the standard component (X) comprises only one feature. For each feature (F), there are usually provided with a plurality of species.

For each standard component (X), the featured components (Xi) correspondingly are defined as the components with the same numbers of features while distinctive species provided in at least one feature. Usually, there are a plurality of featured components (Xi) corresponding to each standard component (X). For describing the featured component (Xi) in a standardized manner, a standard coding system is defined. Each of species has an identification code (Z) correspondingly. Z may be a character, or an integer, or a combination of characters and an integer.

For example, if some standard component (A) has two features: K and G. K has three species: K1, K2 and K3. G has two species: G1 and G2. The aforementioned K1, K2, K3, G1 and G2 are identification codes individually. Thereby, one featured component (A1) may be defined as K1G1 by the standard coding system.

The permutation and combination module (40) is electrically connected to the standard component database (100) and the component code set database (20). The permutation and combination module (40) is applied for permuting and combining the identification codes (Z) pertaining to each standard component (X) in all possible ways so as to form a plurality of featured components (Xi). For example, if a standard component (A) has two features: K and G. K has three species: K1, K2 and K3. G has two species: G1 and G2. Via the permutation and combination module (40), there are six featured components (Xi) corresponding to the standard component (A) being generated. The six featured components (Xi) have their individual identification codes expressed as K1G1, K1G2, K2G1, K2G2, K3G1 and K3G2. All identification codes corresponding to all possible combinations of the featured components (Xi) are collected and defined as featured component code sets (201). The featured component code sets (201) are stored in the featured component code set database (20).

The prior art code set database (30) is applied for storing all prior art code sets (302). Each of the prior art code sets (302) is derived from a prior object (901) correspondingly by using the definitions of features (F) and identification codes (Z) via the standard coding system in the standard component database (100). The prior object (901) may be converted manually into its corresponding prior art code (302). However, the computer implemented apparatus for automatically generating and filtering creative proposal may further comprise a prior art processing module (33) for automatically converting the prior object (901) into its corresponding prior art code (302).

The prior object (901) may be any kind of public information such as a substantiated article, a photo of a substantiated article, a diagram of an article, a design chart, a patent specification, or a combination of the above. The computer implemented apparatus for automatically generating and filtering creative proposal in the present invention may further comprise a prior art database (90) for storing prior objects (901). The prior art database (90) in some embodiment may be a patent database.

In some preferred embodiment, the prior art code set database (30) further comprises a plurality of prior art partial code sets (304). The prior art partial code sets (304) are derived from each of the prior art code sets (302) by the permutation and combination module (40). For each prior art code set (302), there usually exists a plurality of combinations formed by parts of its partial identification codes. For example, if one of the prior art code sets (302) is K1G2B3, then it has six prior art partial code sets (304) correspondingly formed by the permutation and combination module (40) as K1, G2, B3, K1G2, K1B3, and G2B3. The permutation and combination module (40) selects parts of the identification codes (Z) pertaining to each of said prior art code sets (302), then permutes and combines the parts of the identification codes (Z). Thereby, the prior art partial code sets (304) are formed.

The matching module (50) is electrically connected to the featured component code set database (20) and the prior art code set database (30) and applied for matching the featured component code sets (201) in the featured component code set database (20) with the prior art code sets (302) in the prior art code set database (30). Either the sequential matching process or the parallel matching process may be applied in the matching module (50). It depends on the performance of the computer implemented apparatus.

The sifting module (60) is electrically connected to the matching module (50) and applied for sifting a matching result of the matching module (50). It generates a first code set portfolio (601) and a second code set portfolio (602). The first code set portfolio (601) consists of common code sets that exist in both the featured component code set database (20) and the prior art code set database (30). The second code set portfolio (602) consists of novel code sets that exist only in the featured component code set database (20). The novel code sets do not exist in the prior art code set database (30). The novel code sets in the second code set portfolio (602) are novel and are not disclosed in the prior arts. It means that the featured components corresponding to the novel code sets have not been disclosed in by any prior art recognized in this computer implemented apparatus. These featured components may have novelty if the prior art code set database (30) has collected many and sufficient related prior objects (901). Therefore, each of the novel code sets may be used as a reference for a creative proposal.

The output module (70) is electrically connected to the shifting module (60) and applied for outputting a sifting result. The sifting result may comprise the first code set portfolio (601), or the second code set portfolio (602), or the both.

However, further investigation or professional evaluation may be necessary to confirm whether these featured components corresponding to the novel code sets in the second code set portfolio (602) satisfy the criteria of non-obviousness and industrial applicability. At last, the matching and sifting results, including the first code set portfolio (601) and second code set portfolio (602) are automatically generated and output through the output module (70) so as to accomplish a computer implemented apparatus for automatically generating and filtering creative proposal of the present invention.

Although the particular embodiments of the invention have been described in detail for purposes of illustration, it will be understood by one of ordinary skill in the art that numerous variations will be possible to the disclosed embodiments without going outside the scope of the invention as disclosed in the claims and the equivalents.

What is claimed is:

1. A computer implemented apparatus for automatically generating and filtering creative proposal, comprising a standard component database (100), a permutation and combination module (40), a featured component code set database (20), a prior art code set database (30), a matching module (50), a sifting module (60), and an output module (70), characterized in that:

said standard component database (100) contains a plurality of standard components (X), each standard component (X) comprises at least one feature (F), each feature (F) is further provided with at least one species, each species has an identification code (Z) correspondingly;

said permutation and combination module (40) is electrically connected to said standard component database (100) and permutes and combines all identification codes (Z) pertaining to each of said standard components (X) so as to form a plurality of featured components (Xi), each featured component (Xi) is provided with a featured component code set (201) correspondingly;

said featured component code set database (20) is electrically connected to said permutation and combination module (40) and stores all of said featured component code sets (201);

said prior art code set database (30) comprises a plurality of prior art code sets (302), wherein, each prior art code set (302) is derived from a prior object (901) correspondingly by using the definitions of features (F) and identification codes (Z) in the standard component database (100);

said matching module (50) is electrically connected to said featured component code set database (20) and said prior art code set database (30) and matches featured component code set database (20) with said prior art code set database (30);

said sifting module (60) is electrically connected to said matching module (50) and generates a first code set portfolio (601) and a second code set portfolio (602), wherein, the first code set portfolio (601) consists of common code sets existing in both the featured component code set database (20) and the prior art code set database (30), the second code set portfolio (602) consists of novel code sets existing only in the featured component code set database (20); and said output module (70) is electrically connected to said shifting module (60) and outputs a sifting result of said sifting module (60).

2. The computer implemented apparatus for automatically generating and filtering creative proposal of claim 1, wherein, the sifting result output by the output module (70) comprises the first code set portfolio (601).

3. The computer implemented apparatus for automatically generating and filtering creative proposal of claim 1, wherein, the sifting result output by the output module (70) comprises the second code set portfolio (602).

4. The computer implemented apparatus for automatically generating and filtering creative proposal of claim 1, wherein, the prior art code set (302) is derived from a prior object (901) which is obtained from any public information.

5. The computer implemented apparatus for automatically generating and filtering creative proposal of claim 1, wherein, the prior art code set (302) is derived from a prior object (901) which is selected from the group consisting of a substantiated article, a photo of a substantiated article, a diagram of an article, a design chart of an article, and a patent specification of an article.

6. The computer implemented apparatus for automatically generating and filtering creative proposal of claim 1, wherein, the matching module (50) comprises a parallel matching process.

7. The computer implemented apparatus for automatically generating and filtering creative proposal of claim 1, wherein, the matching module (50) comprises a sequential matching process.

8. The computer implemented apparatus for automatically generating and filtering creative proposal of claim 1, wherein, the prior art code set (302) is converted manually from the corresponding prior object (901).

9. The computer implemented apparatus for automatically generating and filtering creative proposal of claim 1, further comprising a prior art processing module (33), whereby, the prior art code set (302) is converted automatically by the prior art processing module (33) from the corresponding prior object (901).

10. The computer implemented apparatus for automatically generating and filtering creative proposal of claim 1, further comprising a prior art database (90) for storing a plurality of prior objects (901).

11. The computer implemented apparatus for automatically generating and filtering creative proposal of claim 1, said prior art code set database (30) further comprising a plurality of prior art partial code sets (304), wherein, said permutation and combination module (40) selects, permutes and combines parts of the identification codes (Z) pertaining to each of said prior art code sets (302) so as to form said plurality of prior art partial code sets (304).

* * * * *